United States Patent
Nishina et al.

(10) Patent No.: US 7,658,093 B2
(45) Date of Patent: Feb. 9, 2010

(54) LIQUID DISCRIMINATING APPARATUS AND LIQUID DISCRIMINATING METHOD

(75) Inventors: Mitsuhiro Nishina, Ageo (JP); Toshikazu Katou, Ageo (JP); Hiroyuki Kurita, Ageo (JP)

(73) Assignee: Nissan Diesel Motor Co., Ltd., Ageo-shi (JP)

( * ) Notice: Subject to any disclaimer, the term of this patent is extended or adjusted under 35 U.S.C. 154(b) by 262 days.

(21) Appl. No.: 10/577,495

(22) PCT Filed: Sep. 6, 2004

(86) PCT No.: PCT/JP2004/012938
§ 371 (c)(1), (2), (4) Date: Jan. 22, 2007

(87) PCT Pub. No.: WO2005/040567
PCT Pub. Date: May 6, 2005

(65) Prior Publication Data
US 2007/0209428 A1    Sep. 13, 2007

(30) Foreign Application Priority Data
Oct. 27, 2003    (JP)    ............................. 2003-365375

(51) Int. Cl.
*G01N 25/00*    (2006.01)
(52) U.S. Cl. .................................................... 73/61.46
(58) Field of Classification Search ................... 73/702, 73/61.46, 1.02
See application file for complete search history.

(56) References Cited

U.S. PATENT DOCUMENTS

| | | | |
|---|---|---|---|
| 6,442,932 B1 | 9/2002 | Hoffmann et al. | |
| 7,100,367 B2 * | 9/2006 | Schaller et al. | 60/286 |
| 2005/0011183 A1 | 1/2005 | Ripper et al. | |
| 2007/0006639 A1 * | 1/2007 | Sasanuma et al. | 73/53.01 |
| 2007/0054409 A1 * | 3/2007 | Inoue et al. | 436/108 |
| 2007/0075467 A1 | 4/2007 | Osaku et al. | |
| 2007/0199308 A1 * | 8/2007 | Satou et al. | 60/286 |

(Continued)

FOREIGN PATENT DOCUMENTS

DE    198 18 448 A1    10/1999

(Continued)

*Primary Examiner*—Hezron Williams
*Assistant Examiner*—Gunnar J Gissel
(74) *Attorney, Agent, or Firm*—McDermott Will & Emery LLP

(57) ABSTRACT

A concentration sensor for detecting a concentration of a liquid reducing agent through heat transfer characteristics between separate two points is provided in a storage tank for storing a liquid supplied to an $NO_x$ reduction catalyst. When the concentration read from the concentration sensor is 0% or less, the liquid is discriminated to be water, that is, it is utilized that when water is converted to the concentration of a liquid reducing agent, it is 0%, and it is also 0% even when the concentration is reduced by convection. When the concentration is greater than a predetermined value, it is discriminated that no liquid is present, since it is considered that the output of the sensor is abnormal because of the absence of a liquid in the tank. On the other hand, when the concentration is greater than 0% and less than a predetermined value, the liquid is discriminated to be the liquid reducing agent, provided that the concentration value may include an error.

3 Claims, 2 Drawing Sheets

U.S. PATENT DOCUMENTS

2007/0202019 A1 * 8/2007 Nishina et al. .............. 422/163

FOREIGN PATENT DOCUMENTS

| | | |
|---|---|---|
| DE | 198 41 770 A1 | 4/2000 |
| EP | 1 538 437 A1 | 6/2005 |
| JP | 04-282433 | 10/1992 |
| JP | 2000-027627 | 1/2000 |
| JP | 2001-020724 | 1/2001 |
| JP | 2002-508466 | 3/2002 |
| JP | 2002-513109 | 5/2002 |
| JP | 2002-527660 | 8/2002 |
| JP | 2002-370016 | 12/2002 |
| JP | 2002-371831 | 12/2002 |
| JP | 2004-517336 | 6/2004 |
| JP | 2004-257325 | 9/2004 |
| JP | 2005-30888 | 2/2005 |
| WO | WO 99/30810 | 6/1999 |
| WO | WO 99/55445 | 11/1999 |
| WO | WO 00/21881 | 4/2000 |
| WO | WO-02-27280 | 4/2002 |
| WO | WO-02-057603 | 7/2002 |
| WO | WO 2005/005971 | 1/2005 |

* cited by examiner

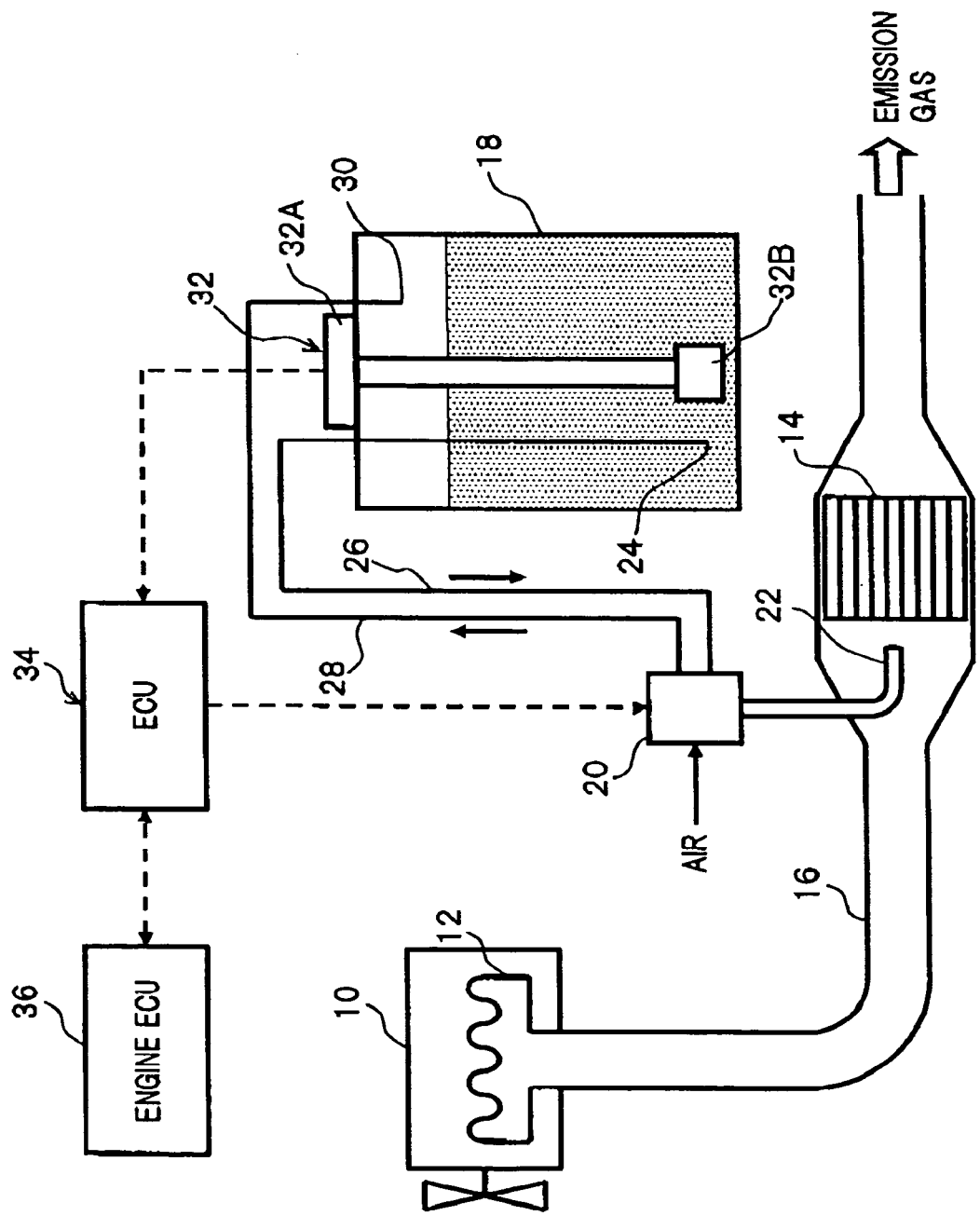

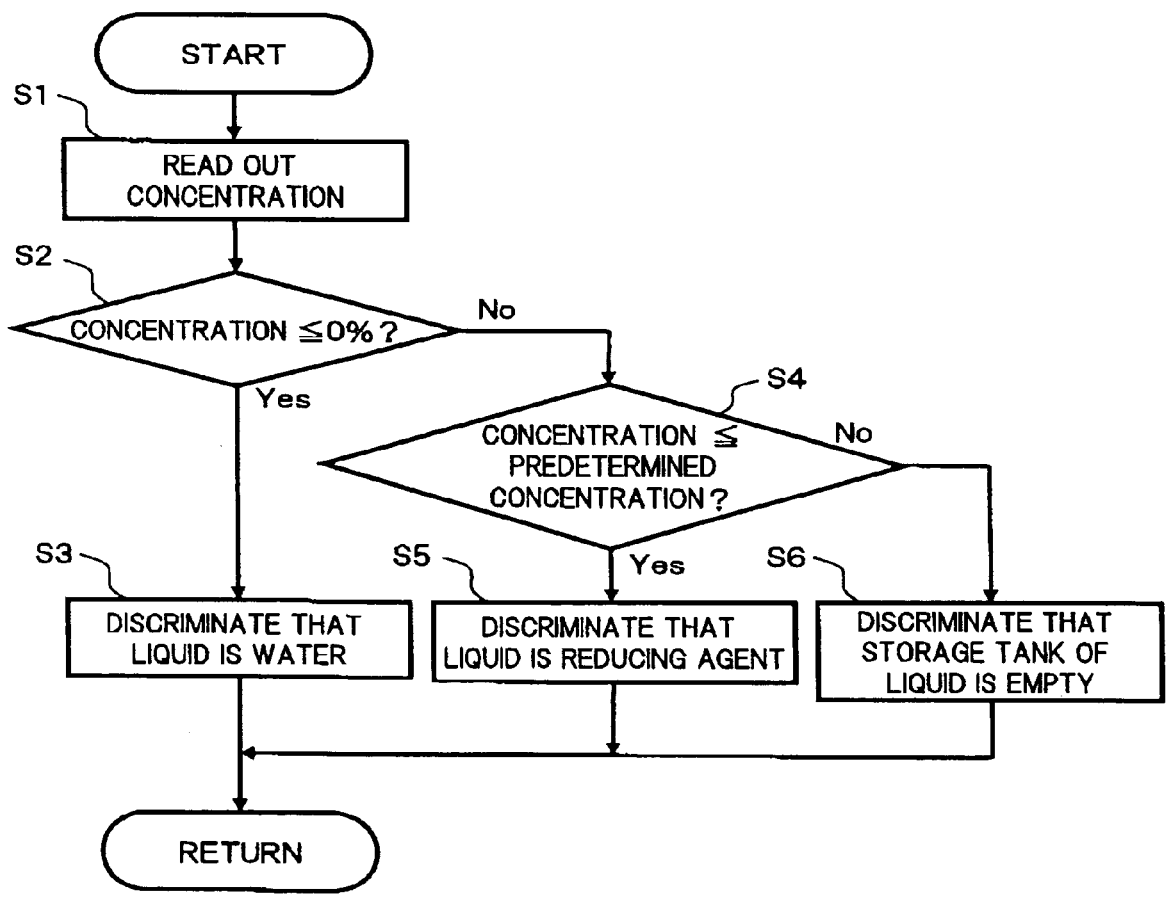

LIQUID DISCRIMINATING APPARATUS AND LIQUID DISCRIMINATING METHOD

This is a national stage application of PCT/JP2004/012938, filed on Sep. 6, 2004.

BACKGROUND OF THE INVENTION

1. Field of the Invention

The present invention relates to a technology for highly accurately discriminating a liquid substance which is supplied to a nitrogen oxide reduction catalytic converter disposed in an engine exhaust system of a moving vehicle, by utilizing a concentration sensor which detects the concentration of a liquid reducing agent based on a heat transfer characteristic between two positions spaced apart from one another.

2. Description of the Related Art

As a catalytic purification system for removing nitrogen oxides ($NO_x$) contained in the exhaust emission of an engine, there has been proposed an exhaust emission purifying apparatus disclosed in Japanese Unexamined Patent Publication No. 2000-27627. In the exhaust emission purifying apparatus, a $NO_x$ reduction catalytic converter is disposed in an engine exhaust system, and a reducing agent is injection-supplied to the exhaust upstream of the $NO_x$ reduction catalytic converter, so that $NO_x$ in the exhaust emission and the reducing agent are subjected to the catalytic-reduction reaction, to thereby purify $NO_x$ into harmless components The reducing agent is stored in a storage tank in a liquid state at an ordinary temperature, and a necessary amount thereof corresponding to engine operating conditions is injection-supplied from an injection nozzle. Further, for the reduction reaction, ammonia having the good reactivity to $NO_x$ is used, and as the reducing agent, the urea aqueous solution, the ammonia aqueous solution or another type aqueous reducing agent solution (to be referred to as a liquid reducing agent hereunder), which hydrolyze due to heat of the exhaust emission and water vapor to easily generate ammonia, is used.

However, according to the above-described conventional exhaust emission purifying apparatus, when the concentration of the liquid reducing agent is changed due to any factor, if a driver continues operating of the engine without taking notice of this change, there is a possibility that the $NO_x$ reduction efficiency by the $NO_x$ reduction catalytic converter is lowered, and therefore, the required $NO_x$ purification performance cannot be achieved. In particular, continually operating the engine, irrespective of improper mixing ratio between the reducing agent and the solvent in the liquid reducing agent, despite of contamination of the liquid reducing agent by another type of aqueous solution or the solvent, or the lack of the residue of the liquid reducing agent or the like, raises a possibility of a large amount of discharge of $NO_x$ from the engine.

Therefore, it is considered that a concentration sensor which detects the concentration of the liquid reducing agent based on heat transfer characteristics between two positions spaced apart from each other is disposed in the storage tank. However, if such a concentration sensor is mounted on a moving vehicle such as an automobile, the following problems are caused. Namely, during the driving of the moving vehicle, since a vehicle body is continually subjected to vibration due to the irregularity of road surfaces, the convection can be generated in the liquid reducing agent in the storage tank. If the convection is generated in the liquid reducing agent, the heat transfer characteristics using the liquid reducing agent as a heat transfer medium is changed, and therefore, the detection accuracy of the concentration of the liquid reducing agent is significantly lowered. On the other hand, since the $NO_x$ purification is hardly expected unless the liquid reducing agent is supplied to the $NO_x$ reduction catalytic converter, it is necessary to discriminate at least whether the liquid in the storage tank is the water or the liquid reducing agent, or the storage tank is empty.

SUMMARY OF THE INVENTION

Therefore, in view of the problems in the conventional technology as described above the present invention has an object to provide a liquid discrimination technology, utilizing the property of a concentration sensor, in which the detected concentration is lowered when the convection is generated in the liquid reducing agent, so as to be capable of highly accurately discriminating the liquid which is supplied to the $NO_x$ reduction catalytic converter disposed in the engine exhaust system of the moving vehicle.

In order to achieve the above object, according to the present invention, in a storage tank which stores the liquid supplied to a nitrogen oxide reduction catalytic converter disposed in an engine exhaust system, the concentration of a liquid reducing agent is detected based on a heat transfer characteristic between two positions spaced apart from each other, and when the detected concentration is equal to or less than 0%, or more than 0% and also equal to or less than the predetermined concentration, or more than the predetermined concentration, it is discriminated that the liquid in the storage tank is the water or the liquid reducing agent, or that the storage tank is empty.

At this time, it is desirable that the frequency at which the detected concentration becomes equal to or less than 0% is counted up, and when the counted frequency reaches the predetermined frequency, it is discriminated that the liquid in the storage tank is the water. Thus, it is not discriminated that the liquid in the storage tank is the water, immediately after the concentration of the liquid reducing agent becomes equal to or less than 0%, but it is discriminated that the liquid in the storage tank is the water, only when the counted frequency reaches the predetermined frequency. Therefore, the erroneous discrimination caused by a noise or the like is reduced, thereby enabling the improvement of liquid discrimination accuracy. Further, if the discrimination result is displayed visibly, it is possible to recognize the state of the liquid in the storage tank at a glance, and accordingly, the replenishment of the liquid reducing agent or the like can be performed if necessary, so that the purification performance of nitrogen oxides can be appropriately maintained.

According to the present invention, when the concentration of the liquid reducing agent, which is detected based on the heat transfer characteristic between the two positions spaced apart from each other, is equal to or less than 0%, or more than 0% and also equal to or less than the predetermined concentration, or more than the predetermined concentration, it is discriminated that the liquid in the storage tank is the water or the liquid reducing agent, or that the storage tank is empty. Namely, when the convection is generated in the liquid, a part of heat amount which is transmitted between the two spaced-apart positions is carried with the convection, so that the heat amount transmitted from one of the two spaced-apart positions to the other is decreased. Thus, the detected concentration of the liquid reducing agent is lowered. However, since the concentration of the water is 0% if converted into the concentration of the liquid reducing agent, it is possible to discriminate that the liquid in the storage tank is the water when the concentration of the liquid is equal to or less than 0%, irrespective of whether or not the convection is generated. Further, since the liquid reducing agent supplied to the nitrogen oxide reduction catalytic converter has the predetermined concentration, although the detected concentration of the liquid reducing agent can be lowered due to the convection generation, the concentration equal to or more than the predetermined concentration can not be detected. When the concentration equal to or more than the predetermined concentration is detected, a concentration detection signal is abnormal, and as a factor thereof, it can be considered that the storage tank is empty. Therefore, when the concentration reaches the predetermined concentration or more, it is possible to discriminate that the storage tank is empty. On the other hand, if the concentration is more than 0% and also equal to or less than the predetermined concentration, although there is a possibility that the concentration includes an error, it is possible to discriminate that the liquid in the storage tank is the liquid reducing agent.

Consequently, it is possible to discriminate with high accuracy that the liquid in the storage tank is the water or the liquid reducing agent, or that the storage tank is empty, irrespective of whether or not the convection is generated in the liquid in the storage tank.

BRIEF DESCRIPTION OF THE DRAWINGS

FIG. 1 is a block diagram showing an exhaust emission purifying apparatus provided with a liquid discriminating apparatus according to the present invention.

FIG. 2 is a flowchart showing a liquid discrimination process.

DESCRIPTION OF THE PREFERRED EMBODIMENTS

Details of the present invention will be described hereunder, referring to the appended drawings.

FIG. 1 shows a configuration of an exhaust emission purifying apparatus provided with a liquid discriminating apparatus according to the present invention.

The exhaust emission of an engine 10 is discharged into the atmosphere from an exhaust manifold 12 via an exhaust pipe 16 in which a $NO_x$ reduction catalytic converter 14 is disposed. To be specific, in the exhaust pipe 16, there are disposed three catalytic converters, namely, a nitrogen monoxides (NO) oxidation catalytic converter, a $NO_x$ reduction catalytic converter and an ammonia slip oxidation catalytic converter, in this order from the exhaust upstream side, and a temperature sensor, an oxygen sensor and the like are disposed on the front and the rear side of the three catalytic converters, so that an exhaust system is configured, but the details thereof is not shown in the figure. Further, to the exhaust upstream of the $NO_x$ reduction catalytic converter 14, a liquid reducing agent stored in a storage tank 18 passes through a reducing agent supply device 20 and an injection nozzle 22, and is injection-supplied together with the air. Here, as the liquid reducing agent, the urea aqueous solution is used in the present embodiment. However, the ammonia aqueous solution, or diesel oil, petroleum or gasoline, mainly containing hydrocarbon, may be used.

The urea aqueous solution which is the aqueous solution in which urea in a solid or powder state is dissolved, is sucked via an inlet port 24 which is opened at a lower position in the vicinity of a bottom portion of the storage tank 18, and supplied to the reducing agent supply device 20 through supply piping 26. Here, in the urea aqueous solution supplied to the reducing agent supply device 20, the surplus urea aqueous solution which does not contribute to the injection passes through return piping 28 and is returned into the storage tank 18 via a return port 30 which is opened at an upper position of the storage tank 18.

The urea aqueous solution injection-supplied to the exhaust upstream of the $NO_x$ reduction catalytic converter 14 is hydrolyzed with the exhaust heat and the water vapor in the exhaust emission, so that ammonia is easily generated. It is known that generated ammonia reacts with $NO_x$ in the exhaust emission in the $NO_x$ reduction catalytic converter 14, so as to purify $NO_x$ into the water and the harmless gas.

Further, a concentration sensor 32 serving as a concentration detecting device for detecting the concentration of the urea aqueous solution is attached to the storage tank 18. Namely, a base portion 32A incorporating therein a circuit substrate is fixed on a top wall of the storage tank 18, and also, a detecting portion 32B is suspended from the base portion 32A toward the bottom portion of the storage tank 18.

Here, the detecting portion 32B, of which temperature sensors are disposed on two positions spaced apart from each other, respectively, and a heater is incorporated in at least one of the temperature sensors, is used. Then, the concentration of the urea aqueous solution is detected based on thermal characteristics in which the heat of the one temperature sensor is transmitted to the other temperature sensor when the one temperature sensor is heated. To be specific, when the heater incorporated in the one temperature sensor is operated for a predetermined period of time t, the temperature of the other temperature sensor gradually rises with a characteristic according to the thermal conductivity of the urea aqueous solution. Then, it is possible to detect the concentration of the urea aqueous solution, according to a temperature rise characteristic for when the operation of the heater is stopped. As the concentration sensor 32, the one manufactured and distributed by Mitsui Mining and Smelting Co., Ltd. in Japan is known.

An output signal from the concentration sensor 32 is input to a control unit 34 which contains a built-in computer. Further, the control unit 34 receives engine operating conditions, such as, a signal of an engine rotating speed, a signal of a fuel injection quantity and the like, from an engine control unit 36 which performs various controls of the engine 10, via CAN (Controller Area Network). Then, in the control unit 34, the reducing agent supply device 20 is controlled according to the engine operating conditions in accordance with a control program stored in a ROM (Read Only Memory), and also, various functions for discriminating the liquid in the storage tank 18 are realized.

FIG. 2 shows a liquid discrimination process for discriminating the liquid in the storage tank 18.

In step 1 (to be abbreviated as S1 in the drawing, and the same rule will be applied to the subsequent steps), the concentration of the urea aqueous solution is read out from the concentration sensor 32.

In Step 2, it is determined whether or not the concentration of the urea aqueous solution is equal to or less than 0%. Then, if the concentration of the urea aqueous solution is equal to or less than 0%, the routine proceeds to Step 3 (Yes) where it is discriminated that the liquid in the storage tank 18 is the water. On the other hand, if the concentration of the urea aqueous solution is more than 0%, the routine proceeds to Step 4 (No). Here, the reason why the detected concentration takes the value equal to or less than 0% is that the concentration is calculated based on the heat transfer characteristics between the two spaced-apart positions in accordance with the predetermined rules. Thus, the concentration of the urea aqueous solution does not actually have a negative value.

In Step 4, it is determined whether or not the concentration of the urea aqueous solution is equal to or less than the predetermined concentration (for example, 50%). Then, if the concentration of the urea aqueous solution is equal to or less than the predetermined concentration, the routine proceeds to step 5 (Yes) where it is discriminated that the liquid in the storage tank 18 is the urea aqueous solution, in other words, that the storage tank 18 stores the urea aqueous solution therein. On the other hand, if the concentration of the urea aqueous solution is more than the predetermined concentration, the routine proceeds to step 6 (No) where it is discriminated that the storage tank 18 is empty.

According to the liquid discrimination process as described above, it is possible to discriminate, with high accuracy, that the liquid in the storage tank 18 is either the water or the urea aqueous solution, or that the storage tank 18 is empty, irrespective of whether or not the convection is generated in the liquid in the storage tank 18. Namely, when the convection is generated in the liquid, since a part of heat amount which is generated by the heater of the concentration sensor 32 is carried with the convection, the heat amount transmitted from one of the temperature sensors to the other temperature sensor is decreased so that the detected concentration of the urea aqueous solution is lowered. However, since the concentration of the water is 0% if converted into the concentration of the urea aqueous solution, it is possible to discriminate that the liquid in the storage tank 18 is the water when the concentration detected by the concentration sensor 32 is equal to or less than 0%, irrespective of whether or not the convection is generated. Further, since the urea aqueous solution which is supplied to the reduction catalytic converter in the exhaust emission purifying apparatus has the predetermined concentration, although the detected concentration of the urea aqueous solution can be lowered due to the convection generation, the concentration equal to or more than the predetermined concentration can not be detected. When the concentration equal to or more than the predetermined concentration is detected, the output signal from the concentration sensor 32 is abnormal, and as a factor thereof, it can be considered that the storage tank is empty. Accordingly, when the concentration detected by the concentration sensor 32 reaches the predetermined concentration or more, it is possible to discriminate that the storage tank is empty. On the other hand, when the concentration detected by the concentration sensor 32 is more than 0% and also equal to or less than the predetermined concentration, although there is a possibility that the concentration includes an error, it is possible to discriminate that the liquid in the storage tank is the urea aqueous solution.

Incidentally, considering a possibility that a noise or the like is superimposed on the signal from the concentration sensor 32, so that the concentration discrimination of the urea aqueous solution, in particular, the water discrimination, is not performed accurately, the frequency at which the concentration of the urea aqueous solution becomes equal to or less than 0% is counted up, and also, when the counted frequency reaches the predetermined frequency, it may be discriminated that the liquid in the storage tank 18 is the water. Thus, it is possible to reduce the erroneous discrimination caused by the noise or the like, to thereby improve the liquid discrimination accuracy.

Further, it is desirable that the discrimination result of the liquid in the storage tank 18 is displayed visibly on an installment panel of a moving vehicle by means of an indicating lamp. As a result, a driver can recognize the state of the liquid in the storage tank 18 at a glance, and the replenishment of the urea aqueous solution into the storage tank 18 or the like can be performed if necessary. Thus, the $NO_x$ purification performance by the exhaust emission purifying apparatus can be appropriately maintained.

As described above, the liquid discrimination technology according to the present invention enables the highly accurately discrimination that the liquid in the storage tank is the water or the liquid reducing agent, or the discrimination that the storage tank is empty, irrespective of whether or not the convection is generated in the liquid in the storage tank. Therefore, the liquid discrimination technology according to the present invention is applicable to the moving vehicle and is significantly useful.

We claim:

1. A liquid discriminating apparatus comprising:
   a concentration detecting device that calculates a concentration of a liquid reducing agent based on heat transfer characteristics between two positions spaced apart from each other in a storage tank that stores a liquid supplied to a nitrogen oxide reduction catalytic converter disposed in an engine exhaust system; and
   a control unit that counts up a number of times the concentration calculated by said concentration detecting device becomes equal to or less than 0% and discriminates a type of the liquid in said storage tank,
   wherein said control unit discriminates that the liquid in said storage tank is water when the counted number of times is greater than or equal to a predetermined frequency greater than 1, discriminates that the liquid in said storage tank is the liquid reducing agent when the concentration calculated by said concentration detecting device is more than 0% and equal to or less than a predetermined concentration, and discriminates that said storage tank is empty when the concentration calculated by said concentration detecting device is more than the predetermined concentration.

2. The apparatus according to claim 1, further comprising a display device that visibly displays the discrimination result of said control unit.

3. A liquid discriminating method, comprising:
   calculating a concentration of a liquid reducing agent based on heat transfer characteristics between two positions spaced apart from each other in a storage tank that stores a liquid supplied to a nitrogen oxide reduction catalytic converter disposed in an engine exhaust system;
   counting up a number of times the calculated concentration becomes equal to or less than 0%;
   discriminating that the liquid in said storage tank is water when the counted number of times is greater than or equal to a predetermined frequency greater than 1;
   discriminating that the liquid in said storage tank is the liquid reducing agent when the calculated concentration is more than 0% and equal to or less than a predetermined concentration; and
   discriminating that said storage tank is empty when the calculated concentration is more than the predetermined concentration.

* * * * *